United States Patent
Laine et al.

(10) Patent No.: US 9,766,041 B2
(45) Date of Patent: Sep. 19, 2017

(54) MULTI-TARGET OPTICAL DESIGNATOR

(71) Applicant: The Charles Stark Draper Laboratory, Inc., Cambridge, MA (US)

(72) Inventors: Juha-Pekka Laine, Boston, MA (US); Gregory Blasche, Burlington, MA (US); Robin Dawson, Waltham, MA (US); Sean McClain, Somerville, MA (US); Stephen P. Smith, Acton, MA (US); Robert Larsen, Somerville, MA (US); Charles Arant, Wesley Chapel, FL (US); William Ostrowski, Land O Lakes, FL (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 366 days.

(21) Appl. No.: 14/562,957

(22) Filed: Dec. 8, 2014

(65) Prior Publication Data
US 2016/0161218 A1 Jun. 9, 2016

(51) Int. Cl.
*F41G 3/14* (2006.01)
*G01S 7/481* (2006.01)
(Continued)

(52) U.S. Cl.
CPC ............ *F41G 3/145* (2013.01); *G01S 7/4815* (2013.01); *G01S 17/66* (2013.01); *G01S 17/89* (2013.01)

(58) Field of Classification Search
CPC ........ F41G 3/145; F24C 13/02; G01S 7/4815; G01S 17/89; G01S 17/66; G01S 17/023; G01S 7/4818; G01S 7/484
(Continued)

(56) References Cited

U.S. PATENT DOCUMENTS 5,273,236 A    12/1993    Wootton et al.
5,878,152 A *  3/1999    Sussman ............ G01B 11/2513
                                                    382/106
(Continued)

FOREIGN PATENT DOCUMENTS

EP         2228619 A1    9/2010
WO    2014094119 A1    6/2014

OTHER PUBLICATIONS

International Searching Authority, International Search Report—International Application No. PCT/US2015/059409, dated Feb. 23, 2016 together with the Written Opinion of the International Searching Authority, 13 pages.

*Primary Examiner* — Que T Le
*Assistant Examiner* — Jennifer Bennett
(74) *Attorney, Agent, or Firm* — Sunstein Kann Murphy & Timbers LLP (57) ABSTRACT

A device and method for selectively illuminating and designating multiple targets in the air or on the ground simultaneously. The device comprises a light source, a switching array and a ball lens. Light from the light source is routed through the switching array, which can addressably output multiple light beams simultaneously. The light beams from the switching array illuminate the backside of a low F-number ball lens. The ball lens creates highly collimated output beams independently (and simultaneously) from any of the output source points of the switching array. These output beams can be used to simultaneously designate multiple targets. When the target illuminating device includes an optional detector array, light scattered from targets can be refracted by the balls lens to impinge on the detector array. Signals from the detector array representing the received light beams can be used for target imaging.

22 Claims, 7 Drawing Sheets

(51) Int. Cl.
*G01S 17/66* (2006.01)
*G01S 17/89* (2006.01)

(58) Field of Classification Search
USPC .............. 250/221, 234, 235, 227.11, 227.26;
385/16; 359/245
See application file for complete search history.

(56) References Cited

U.S. PATENT DOCUMENTS

| | | | | |
|---|---|---|---|---|
| 6,104,945 | A * | 8/2000 | Modell | A61B 1/00059 250/461.2 |
| 6,121,603 | A * | 9/2000 | Hang | G02B 21/0032 250/201.3 |
| 7,185,845 | B1 | 3/2007 | Hartman et al. | 244/3.16 |
| 8,764,261 | B2 | 7/2014 | Smith | 362/572 |
| 2005/0126019 | A1 | 6/2005 | Filep | |
| 2006/0044546 | A1* | 3/2006 | Lewin | G01S 17/46 356/4.04 |
| 2009/0000465 | A1* | 1/2009 | Deflumere | F41H 11/02 89/1.11 |
| 2013/0110440 | A1* | 5/2013 | Burkland | G06F 17/00 702/104 |

\* cited by examiner

MULTI-TARGET OPTICAL DESIGNATOR

TECHNICAL FIELD

The present invention relates to a target designation device and, more particularly, to an optical target designator that can designate multiple targets simultaneously.

BACKGROUND ART

Traditional methods of optically designating targets on a battlefield are based on projecting one light beam through a gimbaled, or otherwise directed, optical system. The targeting beam points at individual targets, one at a time. On modern battlefields, such a system can be large, heavy, power hungry, prone to mechanical breakdown and inefficient in that only a single target can be illuminated and designated at a time.

SUMMARY OF THE EMBODIMENTS

In various embodiments, a device for selectively illuminating and designating multiple targets simultaneously is provided. The device comprises a light source, a switching array and a ball lens. Light from the light source is routed through the switching array, which can addressably output multiple light beams simultaneously. The light beams from the switching array illuminate the backside of a ball lens. The ball lens creates highly collimated output beams from any of the source points at the output of the switching array that are illuminated, independently (and simultaneously). Thus, the device can be used to illuminate selectively multiple points on the ground or in the air, simultaneously.

In some embodiments of the invention, the device also includes a detector array. The ball lens receives light beams scattered from the targets and refracts the received lights beams so that the light beams impinge on the detector array. The signal generated by the detector array can be used for imaging, for example.

In preferred embodiments, the light source is a vertical-cavity surface-emitting laser array ("VCSEL") array or a light emitting diode "LED" array. In specific embodiments, the light beams emitted by the balls lens may be modulated to facilitate target identification.

In other embodiments of the invention, a method is provided for imaging objects on a surface. The method includes providing an illumination device that comprises a light source, a switching array, a detector array and a ball lens. The switching array is configured to output at least a first addressable light beam and a second addressable light beam where the beams are generated from light received from the light source. The ball lens receives the first light beam and outputs the first light beam to a first direction when the first beam is illuminated and receives the second light beam and outputs the second beam to a second direction when the second input beam is illuminated. The method further includes: illuminating an area of the surface using the illumination device; capturing an array of pixels from light scattered by the illuminated surface using the ball lens and the detector array; and generating an image of the object by operating on the pixel array.

BRIEF DESCRIPTION OF THE DRAWINGS

The foregoing features of embodiments will be more readily understood by reference to the following detailed description, taken with reference to the accompanying drawings, in which.

DETAILED DESCRIPTION OF SPECIFIC EMBODIMENTS

Figure 1:
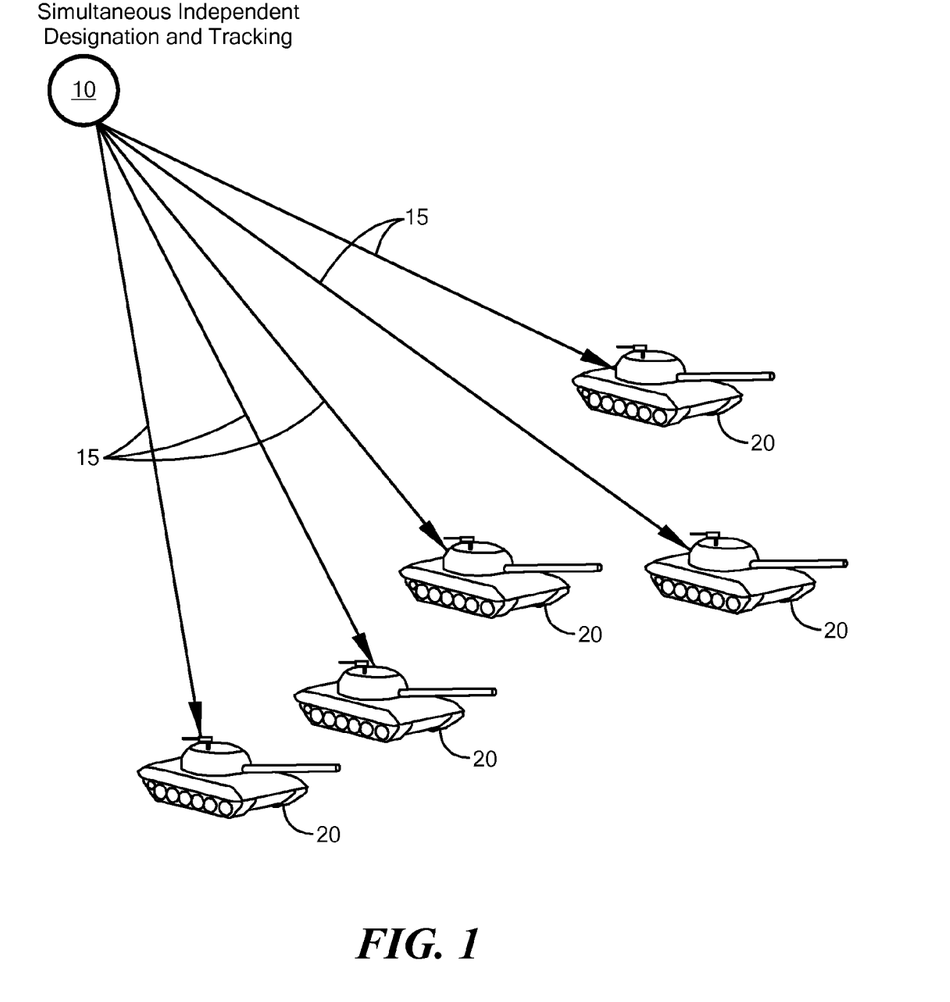
FIG. 1 shows schematically a target designation device simultaneously and independently illuminating multiple tanks on a battlefield, according to an embodiment of the invention.

In various embodiments of the invention, a device is provided for selectively illuminating and designating multiple targets simultaneously. The device comprises a light source, an optical switching array and a ball lens. Light from the light source is routed through the optical switching array, which can addressably output multiple light beams simultaneously. The light beams from the switching array illuminate the backside of a low F-number ball lens. The ball lens creates highly collimated output beams from any of the source points from the output of the switching array that are illuminated, independently (and simultaneously). Thus, the device can be used to illuminate multiple points on the ground or in the air. For example, as shown in FIG. 1, the device 10 can illuminate and designate with light beams 15 each of the tanks 20 in a tank squadron on a battle field. Simultaneous independent point illumination can facilitate simultaneous designation of multiple targets, rapid and accurate laser range map creation, convolution imaging, tracking of multiple targets, etc. When the target illuminating device includes an optional detector array, light scattered from targets can be refracted by the balls lens to impinge on the detector array. Signals from the detector array representing the received light beams can be used for target imaging.

Figure 2:
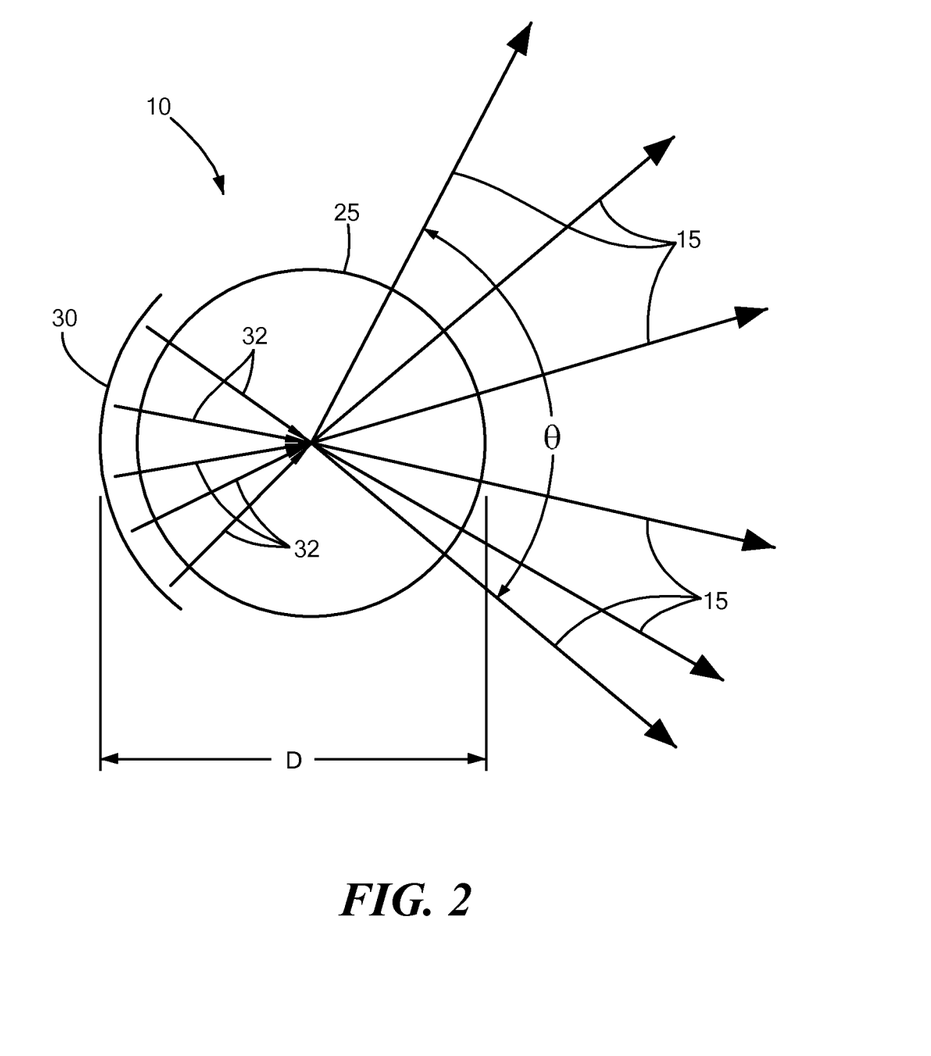
FIG. 2 shows a schematic diagram of the target designation device in the embodiment of FIG. 1.

FIG. 2 shows a schematic view of a multi-target optical designation device 10 according to a preferred embodiment of the invention. The device includes an apparatus 30 that comprises at least a light source and a switching array. The apparatus 30 can generate multiple light beams 32 which are input to a ball lens 25. The switching array can turn on and off each of the light beams 32 individually. Apparatus 30 also enables selection of a subset of the possible light beams 32 to be illuminated simultaneously. The light source and switching array of apparatus 30 can be combined in a single structure or comprise separate structures, as will be clear in embodiments described below. The ball lens 25 receives the illuminated light beams 32 and refracts the beams so that substantially any target within the fan beam of angle θ generated by the ball lens, such as 120 degrees, can be selectively illuminated and, thus, designated as a target. In a specific embodiment, the distance, D, from the plane of the apparatus 30 to the plane of the output surface of the ball lens is about 125 mm. In some embodiments, the ball lens approximates a spherical lens. These ball lens dimensions and shapes are merely exemplary and other dimensions and ball lens shapes can be used. In some embodiments of the invention, the ball lens 25 serves to collect light beams reflected from the targets and refract the returned beams so that these beams impact on apparatus 30. In embodiments where apparatus 30 includes a detector array, an image of a battlefield target can be generated from the detected light beams. In various embodiments of the invention, the switching array may employ micro-optic, micro-opto-electro-mechanical system, microelectromechanical system, piezoelectric, electro-optic, and/or liquid crystal technologies.

Figure 3:
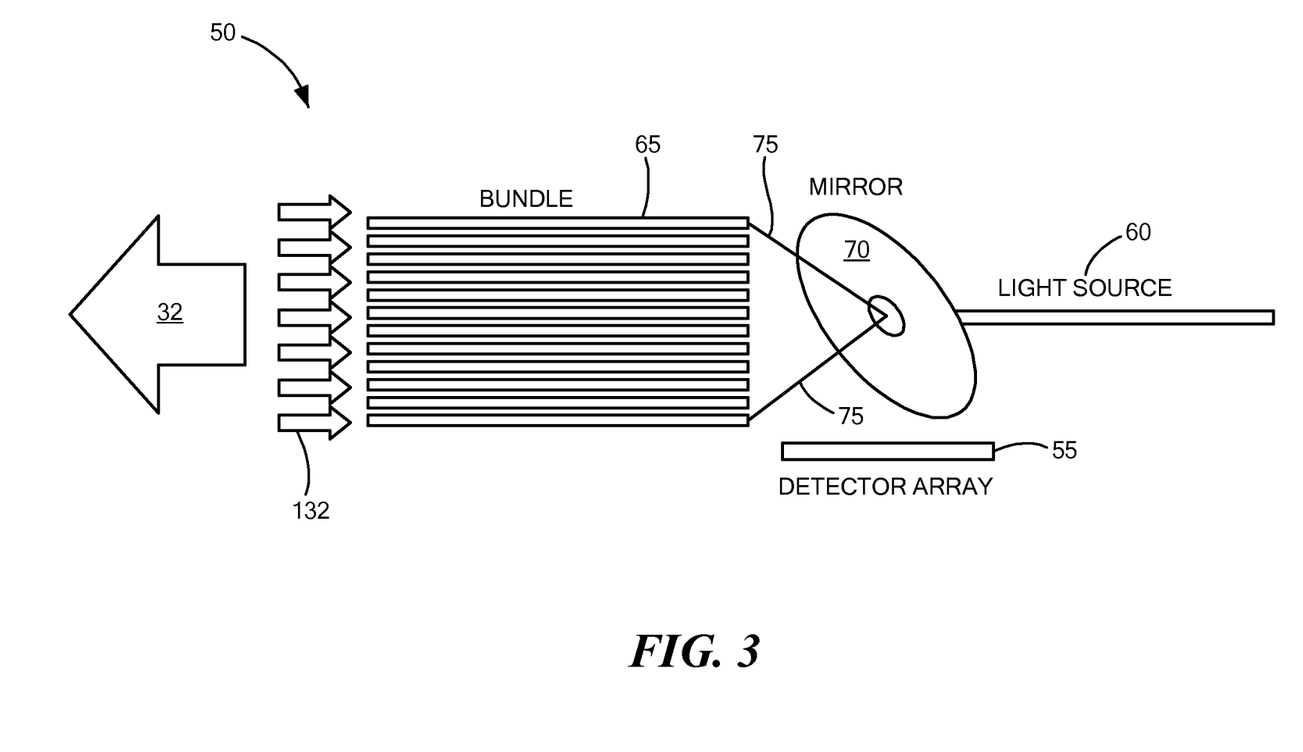
FIG. 3 shows an apparatus comprising a light source/switching array combined with a detector array for use in an initial embodiment of the target designation device of FIG. 2.
Figure 4:
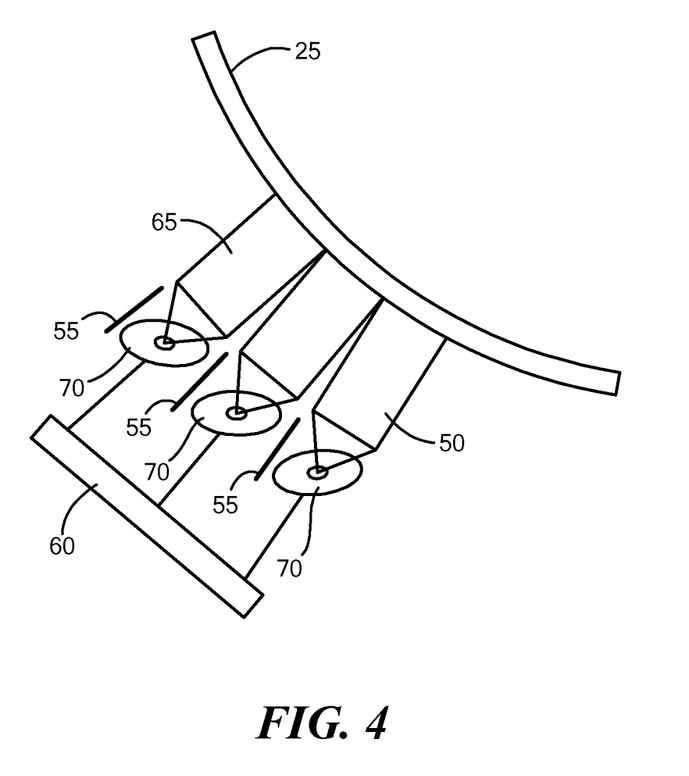
FIG. 4 shows the apparatus of FIG. 3 positioned with respect to the ball lens in an initial embodiment of the target designation device of FIG. 2.

FIG. 3 shows a combination light source and switching array apparatus 50 for use in the target designation device 10 of FIG. 2, according to an embodiment of the invention. Apparatus 50 includes a light source 60, a mirror 70, such as a half-silvered mirror, and an optical fiber bundle 65. The light source 60 illuminates the mirror 70 which transmits and focuses the light on the ends of the optical fibers in the bundle 65. The optical fibers in the bundle have electro-optical switching materials inside the fibers, as is known in the art, allowing the selection of a specific fiber or group of fibers that will illuminate the ball lens 25 with a light beam(s) 32. In this embodiment, the optical fibers form the switching array. FIG. 4 shows the positioning of apparatus 50 with respect to the ball lens 25 in the embodiment of FIG. 3.

Returning to FIG. 3, apparatus 50 can optionally include one or more detector arrays 55 in some embodiments of the invention. For these embodiments, the ball lens 25 serves to collect light beams reflected from the target(s) and refract the returned beams 132 so that these beams impact on apparatus 50. The fiber bundle 65 transmits the returned beams to the mirror 70 which splits a portion of each beam and directs the beam to the detector array(s) 55. An image of battlefield targets can be generated from the detected light beams 132.

The light source 60 in apparatus 50 may take a variety of forms including light emitting diodes (LEDs), laser arrays, incandescent light arrays, etc. In some embodiments, the light sources are modulated to aid in identification of light scattered by targets and subsequently detected. When detection of returned light beams 132 is not required (for imaging or otherwise) the mirror(s) 70 can be omitted from apparatus 50 and other means, such as a lens system, can be used to focus light beams 75 on the ends of the optical fibers in the bundle 65.

Figure 5:
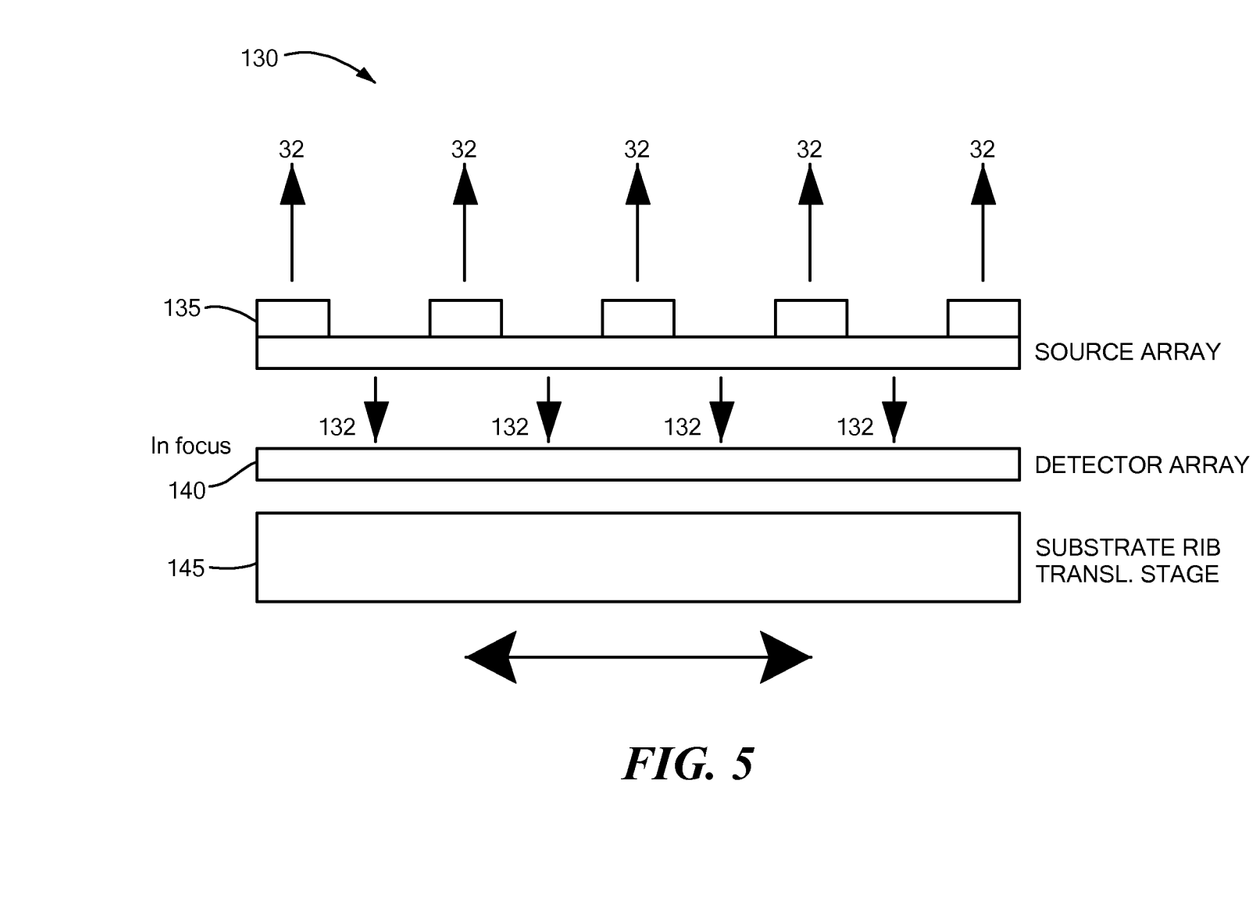
FIG. 5 shows another apparatus comprising a light source/switching array combined with a detector array for use in a further embodiment of the target designation device of FIG. 2.
Figure 6:
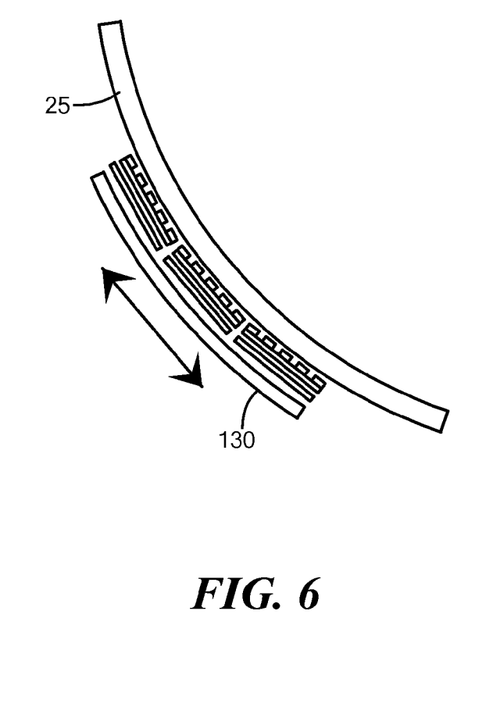
FIG. 6 shows the apparatus of FIG. 5 positioned with respect to the ball lens in the further embodiment of the target designation device of FIG. 2.

In another preferred embodiment of the invention, the apparatus 130 shown in FIG. 5 can be used in the multi-target optical designation device shown in FIG. 2. Apparatus 130 combines the light source and switching array in a single source array structure 135. Structure 135 can be, for example, a VCSEL array. Individual lasers within the array are switched on and off (not shown) to generate the light beams 32 that are input to the ball lens. FIG. 6 shows the positioning of apparatus 130 with respect to the ball lens 25 in the embodiment of FIG. 5. Note that apparatus 130 can curved to conform to the surface of the ball lens. The source array 135 and detector arrays 140 can be formed on substrate 145, as shown in FIG. 5, by photolithography or other means as is known in the art. Other light emitting technologies besides VCSEL arrays can be employed in structure 135. In some embodiments, the light sources are modulated to aid in identification of light scattered by targets and subsequently detected.

Returning to FIG. 5, apparatus 130 can optionally include one or more detector arrays 140 in some embodiments of the invention. For these embodiments, the ball lens 25 serves to collect light beams reflected from the targets and refract the returned beams 132 so that these beams impact on apparatus 130. The source array 135 passes the returning beams 132 through to the detector array 140. An image of battlefield targets can be generated from the detected light beams 132. In some embodiments, apparatus 130 may include a translation stage so that source array 135-detector array 140 can be translated slightly with respect to the balls lens. In this way, moving targets can be tracked. In some embodiments, the translation stage moves the detector array with respect to the source array. In other embodiments, both arrays are translated with respect to the ball lens.

In other embodiments of the invention, apparatus 30 of FIG. 2 can be implemented with:
  a. micro-optical mirrors, such as in projection TVs, placed at the focal plane of the lens. These micro-optical mirrors maneuver light in or out of the ball lens; or
  b. a laser cavity surface can be patterned into the focal plane of the ball. This surface can be optically or electronically pumped from one location. This approach is analogous to employing a fluorescent screen in a cathode ray tube (CRT) display device. In the CRT device, a focused beam of highly directional electrons is raster scanned across the screen with the result that each point produces output light in an isotropic manner. The same concept applies here.

Figure 7:
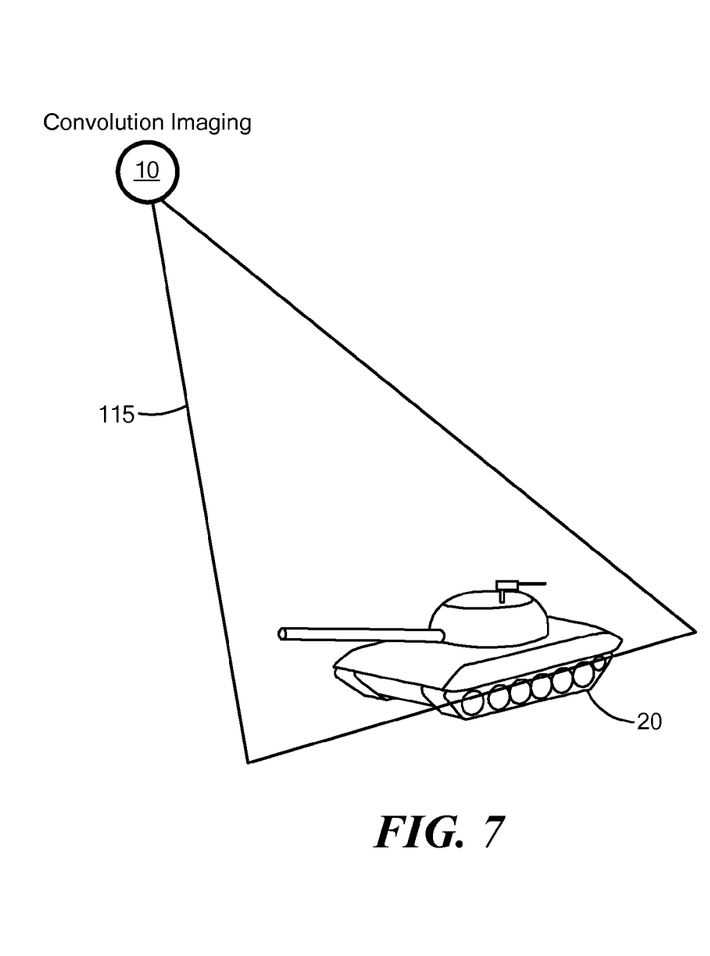
FIG. 7 shows schematically the application of the target designation device illuminating a target and detecting light scattered from the target to enable imaging of the target, in an embodiment of the invention.
Figure 8:
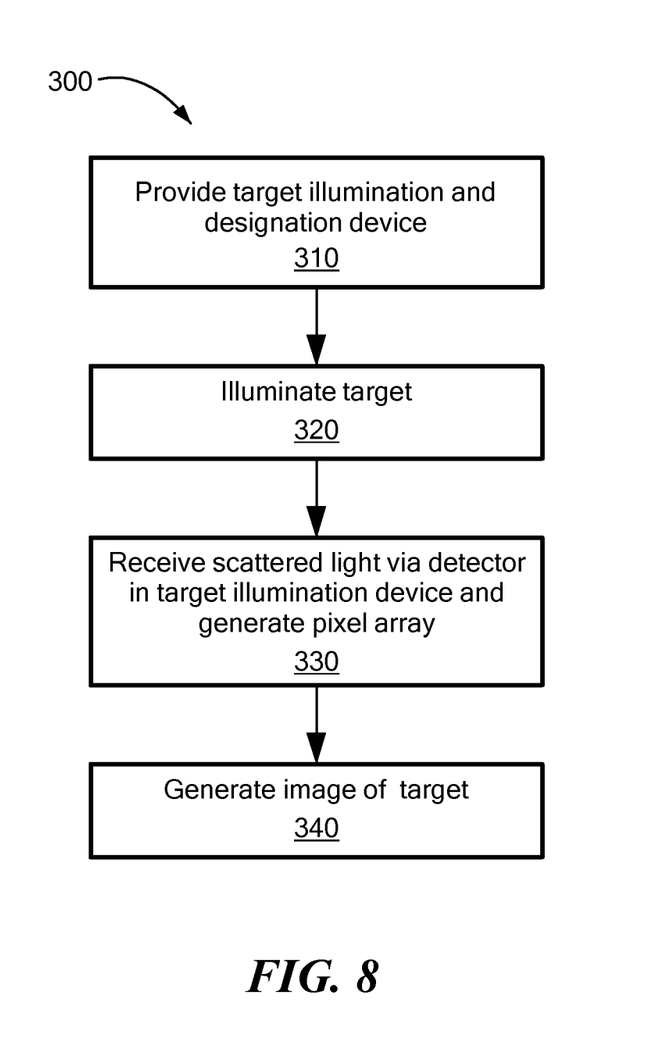
FIG. 8 is a flow diagram of a method for imaging using the target designation device.

In a preferred embodiment of the invention, a method 300 is provided for creating an image of one or more targets using the target designation device. As illustrated schematically in FIG. 7, the target illumination and designation device 10 that includes the detection array illuminates the target 20 and receives scattered light 115 from the target. As shown in the flow diagram of FIG. 8, the method begins by providing the target illumination and designation device 310, as described above, that includes the optional detector array. An area of the earth surface containing the target is illuminated 320 using the target illumination device 10. An array of pixels is generated 330 from light scattered by the illuminated target(s) which is then captured by the ball lens 25 and the detector array (55, 140). An image of the target is generated by operating on the pixel array 340, which may include convolving the image.

The embodiments of the invention described above are intended to be merely exemplary; numerous variations and modifications will be apparent to those skilled in the art. All such variations and modifications are intended to be within the scope of the present invention. Embodiments of the invention may be described, without limitation, by the claims that follow.

What is claimed is:

1. A device for optically designating multiple targets simultaneously and independently, the device comprising:
   a. a light source;
   b. a switching array configured to output at least a first addressable light beam and a second addressable light beam, the first and the second addressable light beams generated from light received from the light source, the light source and the switching array comprising a source array structure; and
   c. a ball lens having a surface positioned adjacent to the source array structure and configured to receive the first addressable light beam and output a first output light beam to a first direction and to receive the second addressable light beam and output a second output light beam to a second direction; and d. a detector array, positioned adjacent to the source array structure, adapted to generate a signal representative of light beams scattered from one or more of the multiple targets and refracted by the ball lens;

wherein the source array structure, the detector array, or a combination of the source array structure and the detector array is configured to be moveable with respect to the ball lens such that the first output light beam in the first direction designates a first target of the multiple targets and the second output light beam in the second direction designates a second target of the multiple targets independently of, and simultaneously with, the first output light beam.

2. The device according to claim 1, where the ball lens is a spherical lens.

3. The device according to claim 1, wherein the light source is an array of lasers.

4. The device according to claim 3, wherein the laser array comprises vertical-cavity surface-emitting lasers.

5. The device according to claim 1, wherein the light source is an array of light emitting diodes.

6. The device according to claim 1, wherein the light source is modulated.

7. The device according to claim 1, wherein the switching array is a micro-optic, a micro-opto-electro-mechanical system, a microelectromechanical system, a piezoelectric, an electro-optic, a liquid crystal array, or combinations thereof.

8. The device according to claim 1, further including:
e. a mirror configured to direct the scattered and refracted light beams to impinge on the detector array.

9. The device according to claim 1, wherein optical fibers are used to transmit light from the light source to the ball lens and the optical fibers form the switching array.

10. The device according to claim 1, wherein the light source and the switching array, that form the source array structure, are separate structures.

11. The device according to claim 1, wherein the light source and the switching array, that form the source array structure, comprise a single structure.

12. The device according to claim 1, further comprising:
e. a translation stage configured to move the source array structure with respect to the ball lens.

13. The device according to claim 12, wherein the translation stage is configured to move the detector array and the source array structure with respect to the ball lens.

14. The device according to claim 1, further comprising:
e. a translation stage configured to move the detector array with respect to the source array structure.

15. The device according to claim 1, wherein the source array structure and the detector array are curved to conform to the surface of the ball lens.

16. A method for optically designating multiple targets simultaneously and independently, the method comprising:
a. providing a designation device including:
i. a light source;
ii. a switching array, configured to output at least a first addressable light beam and a second addressable light beam, the first and the second addressable light beams generated from light received from the light source, the light source and the switching array comprising a source array structure;
iii. a ball lens having a surface positioned adjacent to the source array structure and configured to receive the first addressable light beam and output a first output light beam to a first direction and to receive the second addressable light beam and output a second addressable light beam to a second direction; and
iv. a detector array, positioned adjacent to the source array structure, adapted to generate a signal representative of light beams scattered from one or more of the multiple targets and refracted by the ball lens; and
b. designating a first target of the multiple targets with the first output light beam and designating a second target of the multiple targets with the second output light beam independently of, and simultaneously with, the designating of the first target.

17. The method according to claim 16, where the ball lens is a spherical lens.

18. The method according to claim 16, wherein the light source is an array of lasers.

19. The method according to claim 18, wherein the laser array comprises vertical-cavity surface-emitting lasers.

20. The method according to claim 16, wherein the light source is an array of light emitting diodes.

21. A method for generating an image of one or more targets on a surface:
a. providing an illumination device including:
i. a light source;
ii. a switching array, configured to output at least a first addressable light beam and a second addressable light beam, the first and the second addressable light beams generated from light received from the light source, the light source and the switching array comprising a source array structure;
iii. a ball lens having a surface positioned adjacent to the source array structure and configured to receive the first addressable light beam and output a first output light beam to a first direction and to receive the second addressable light beam and output a second output light beam to a second direction; and
iv. a detector array, positioned adjacent to the source array structure, adapted to generate a signal representative of light beams scattered from one or more of the multiple targets and refracted by the ball lens;
b. designating a first target of the multiple targets with the first output light beam and designating a second target of the multiple targets with the second output light beam independently of, and simultaneously with, the designating of the first target
c. illuminating an area of the surface using the illumination device, the area corresponding to the first target, the second target, or both;
d. capturing light scattered by the illuminated area of the surface using the detector array;
e. generating an array of pixels from the captured light; and
f. generating the image of the one or more targets by operating on the pixel array.

22. The method according to claim 21, wherein operating on the pixel array includes performing a convolution on the pixel array.

* * * * *

UNITED STATES PATENT AND TRADEMARK OFFICE
CERTIFICATE OF CORRECTION

| | | |
|---|---|---|
| PATENT NO. | : 9,766,041 B2 | Page 1 of 1 |
| APPLICATION NO. | : 14/562957 | |
| DATED | : September 19, 2017 | |
| INVENTOR(S) | : Laine et al. | |

It is certified that error appears in the above-identified patent and that said Letters Patent is hereby corrected as shown below:

In Column 6, Line 51:
Replace "target"
With "target;"

In Column 6, Line 55:
Replace "capturing light"
With "capturing the light"

Signed and Sealed this
First Day of May, 2018

Andrei Iancu
*Director of the United States Patent and Trademark Office*